United States Patent

[11] 3,593,314

[72] Inventor Edward W. Moll
King of Prussia, Pa.
[21] Appl. No. 837,607
[22] Filed June 30, 1969
[45] Patented July 13, 1971
[73] Assignee Burroughs Corporation
Detroit, Mich.

[54] MULTISTAGE QUEUER SYSTEM
9 Claims, 6 Drawing Figs.

[52] U.S. Cl. .......... 340/172.5
[51] Int. Cl. .......... G11b 13/00, G06f 7/00
[50] Field of Search .......... 340/172.5

[56] References Cited

UNITED STATES PATENTS

| | | | |
|---|---|---|---|
| 3,300,763 | 1/1967 | Hoehmann | 340/172.5 |
| 3,307,150 | 2/1967 | Bartlett | 340/172.5 |
| 3,390,380 | 6/1968 | Cooke-Yarborough | 340/172.5 |
| 3,401,376 | 9/1968 | Barnes et al. | 340/172.5 |
| 3,422,401 | 1/1969 | Lucking | 340/172.5 |
| 3,437,998 | 4/1969 | Bennett et al. | 340/172.5 |
| 3,449,722 | 6/1969 | Tucker | 340/172.5 |
| 3,487,375 | 12/1969 | Macon et al. | 340/172.5 |
| 3,493,935 | 2/1970 | Questa | 340/172.5 |

*Primary Examiner*—Paul J. Henon
*Assistant Examiner*—R. F. Chapuran
*Attorney*—Carl Fissell, Jr.

ABSTRACT: Queuing systems for storing access request words for a rotating disc file or other sequential access device and implementing them individually as the device becomes ready to effect the corresponding data transfers. The access request words are stored initially in a large capacity cyclically scanned memory unit and are then transferred to a smaller capacity, more rapidly scanned memory unit as the corresponding file locations in the storage device are upcoming. The request words in the first memory are systematically compared for transfer to the secondary memory, where each is again systematically compared with the state of the sequential data file for access to it. If access for a request word in the second memory is not established when the corresponding data file address is reached, (device becomes ready for it) the request is transferred back to the first memory unit.

INVENTOR.
EDWARD W. MOLL
BY George L. Kensinger
ATTORNEY

INVENTOR
EDWARD W. MOLL

BY George L. Kensinger

ATTORNEY

INVENTOR
EDWARD W. MOLL
BY George L. Kensinger
ATTORNEY

INVENTOR
EDWARD W. MOLL
BY George L. Kensinger
ATTORNEY

INVENTOR.
EDWARD W. MOLL

BY [signature]

ATTORNEY

MULTISTAGE QUEUER SYSTEM

CROSS-REFERENCE TO RELATED APPLICATIONS

The present invention is directed to multistage queuer systems for economically storing large numbers of access request words for sequential access storage devices. A copending patent application entitled "File Control System" filed on Nov. 26, 1965, and given Ser. No. 509,925 now U.S. Pat. No. 3,437,998, issued Apr. 8, 1969, and a copending patent application entitled "A Queuer Control System," filed on Mar. 6, 1967, and given Ser. No. 620,848 now U.S. Pat. No. 3,493,935, issued Feb. 3, 1970, describe individual queuer systems which may be utilized in one or more of the multiple queuer stages of the present patent application and are, therefore, incorporated herein by reference. A copending patent application entitled "Instruction Storage and Retrieval Apparatus for Cyclical Storage Means" filed on June 19, 1967, and given Ser. No. 646,923, and a copending patent application entitled "Disk Memory Storage Apparatus and Method for Optimum Disk Zone Formatting Using Single Addressing" filed on July 5, 1968, and given Ser. No. 742,845, relate to systems for storing instructions for addressing the disk file type of sequential access storage device which may be employed in the system of this patent application and are also incorporated herein by reference.

BACKGROUND OF THE INVENTION

This invention relates to queuer systems for storing information transfer jobs or requests to be implemented or performed on a sequential access device. More particularly, the subject invention relates to the storage and queuing of transfer requests to be performed on a rotating or sequential access memory such as a magnetic disk or drum.

Because most rotating memory systems accept only one request for transfer at a time, they are unable to consider other transfer requests until the one being acted upon has been completed. When these memories are used as part of a computer system or data communication system where many data transfers must be performed, the entire system throughput may be limited by this sequential accessing of the data store.

It is desirable, therefore, to process requests for transfers in the same order that they can best be accepted by the sequential access storage device so that they are performed in optimum sequence. This is done by storing all transfers to be effected by the rotating memory and presenting them to it according to the successive angular read-record positions of the device.

Presently utilized systems of queuing provide a single storage device for storing all information transfer requests received. In this method or concept of queuing a single associative or content addressable type memory is generally utilized for storing the transfer requests in the system. In present queuer systems for disk memory devices, the queuer memory stores disk jobs and selects them one at a time for implementation to best advantage according to the disk head position relative to the requested transfers. This storage is generally scanned at a rate limited by the storage device parameters such as the read-write cycle time.

The two storage factors of (1) large storage capacity and (2) low read-write cycle times are both desirable but conflict economically. This economy conflict is accentuated if there is a high number or high rate of data bytes or words to be transferred by a disk file in either real-time or batch operations. It may be imperative that many transfer requests be accepted and implemented during each disk revolution. It also may be necessary to store a large number of disk jobs in the queuer.

SUMMARY OF THE INVENTION

Accordingly, it is an object of the subject invention to provide improved queuer systems for economically storing large numbers of access request words for sequential access devices.

Another object of this invention is to provide queuer systems for sequential access storage devices having large storage capacity together with low effective read-write cycle times.

A further object of this invention is to provide a queuer system for sequential access devices having a queue memory of large capacity and a rapidly scanned smaller queue to effect economies in the storage of access requests for sequential access storage media.

A still further object of this invention is to queue transactions for sequential access storage media in two or more stages to economically reduce look-ahead time therefor.

In accordance with these objects there is provided a first stage, large capacity, low-cost queue memory and a second memory which is scanned at a high rate of speed in an access request queuer system for sequential access devices. Means is provided for comparing at least certain most significant bits of the current address of the sequential access device with each stored request for transferring them to the second queuer stage only when the current address location of the device is approaching the address to which the sampled transfer request relates. The second queuer stage seeks a true comparison between the address locations of the sequential access device and the transfer request addresses during each revolution for each request. If any given information transfer cannot be executed during a revolution of the rotating memory, however, the corresponding access request is returned to the first stage of the queuer.

Other unobvious features and advantages of the subject invention are presented in the following detailed description relating to the accompanying drawings, wherein.

DETAILED DESCRIPTION OF THE PREFERRED EMBODIMENTS

Figure 1:
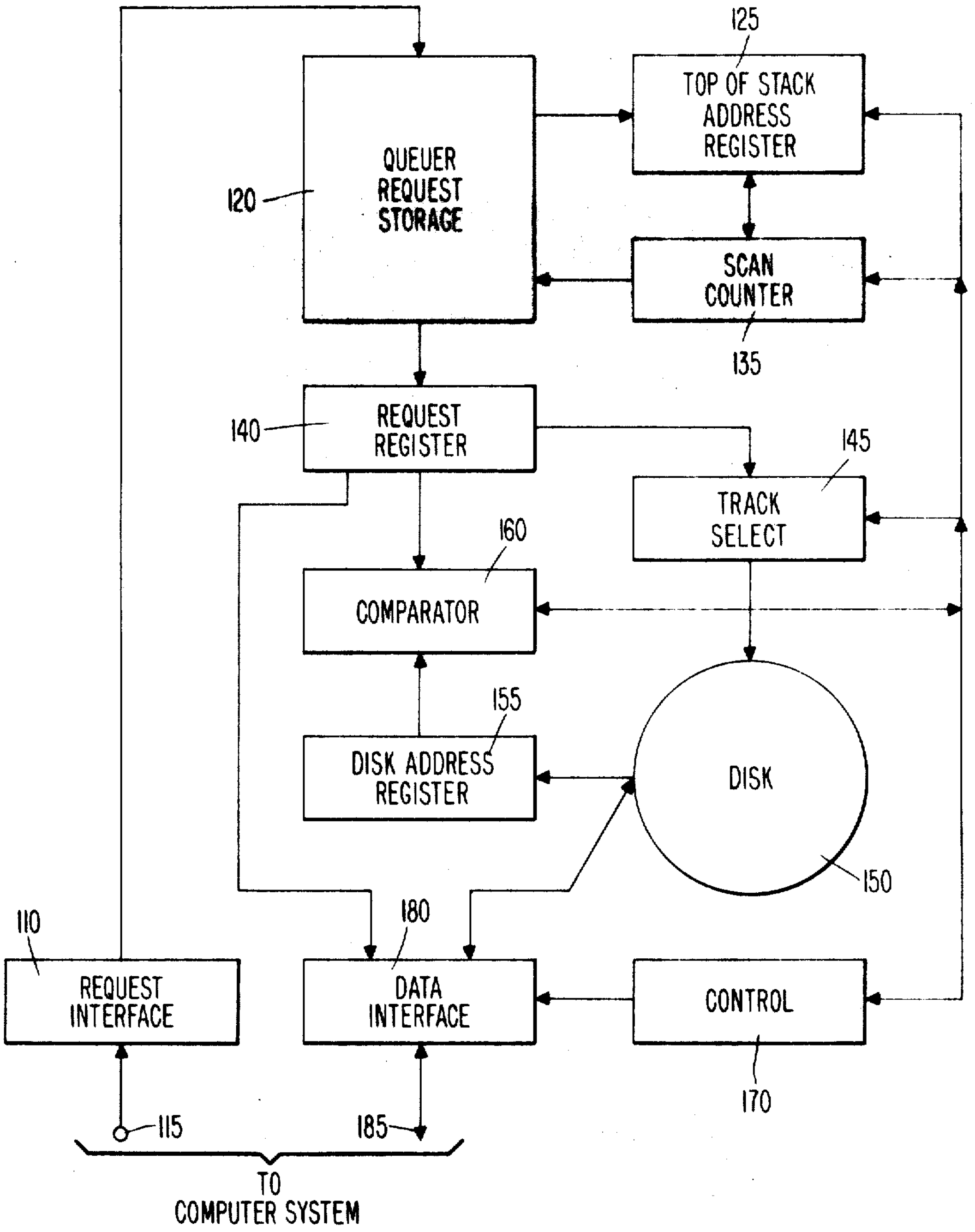
FIG. 1 is a schematic block diagram of a basic queuer system for a disk file.

The basic queuer system illustrated in FIG. 1 includes a request interface unit 110 connected to a queuer request storage unit 120 and having an input terminal 115 for receiving information transfer requests from a computer system or a data communication system. Request storage unit 120 may be a memory stack which is sequentially loaded with access request words received from request interface unit 110. A top of stack address register 125 is coupled to the queuer request storage unit to identify the address of the most recent request entered into the storage unit. A scan counter 135 is coupled to both the queuer request storage unit and to the top of stack address register 125 and a request register 140 is coupled to the output of the request storage unit. Scan counter 135 enables the successive output of the request words located in the request storage unit for transfer to request register 140.

A track select unit 145 is responsive to control unit 170 and to the state of request register 140 for identifying a track on disk unit 150 to be addressed or accessed. A disk address register 155 reflects the current address position of the read-write heads of the disk unit. The output of disk address register 155 is connected to comparator 160 which is also connected to the output of request register 140.

A data interface unit 180 is coupled to the read-write heads of the disk unit 150 and has a cable 185 for transferring data in either direction between a computer or data communication system and the disk unit. The data interface unit 180 is responsive to a signal output of request register 140. A control unit 170 provides control signals to most of the units of the system, including top of stack address register 125, scan counter 135, track select unit 145, comparator 160 and data interface unit 180, and is responsive to comparisons detected by comparator 160.

Requests are entered from a computer system by way of the computer request interface unit 110 and placed in the queuer request storage area of memory unit 120. A running account of the number of requests is monitored by the top of stack address register 125. It selects queuer requests, one at a time, and makes them available for comparison with the current disk address. A true or false indication is given to the control unit 170 each time a queuer request is compared with the current disk address. The disk address register 155 is updated periodically in accordance with disk rotation speed and the minimum size data blocks accessible on the disk unit 150.

The average access time of the disk file unit 150 is dependent on data communication traffic and on queuer efficiencies. The multiple track disk storage unit 150 may have a head per track configuration with an electronic head selection matrix controlled by track select unit 145. Data transfers to and from the disk surface are performed serially. Minimum block capabilities of the disk format permit a small segment size, if desired, to provide versatility in data block transfer size and rapid changes from one data transaction or transfer to another.

When a true comparison between a transfer request address and the current disk address is detected, the control unit 170 initiates a data transfer between the disk unit 150 and the system to which it is coupled by data interface unit 180. If a data transfer is already in progress from a previous true comparison, control unit 170 will interpret the true comparison as being a false comparison and continue scanning.

Queuer request storage is controlled by computer request interface unit 110, top of stack register 125, and scan counter 135. The queuer request interface unit receives requests from the computer or data communications system and stores them in the queuer request storage unit 120 under control of the top of stack register 125. This is done by (1) halting the scan counter, (2) interchanging the contents of the top of stack address register and the scan counter, (3) incrementing the top of stack address register by one, and (4) storing the requests in the queuer request storage unit 120. Once storage of the request is completed, the contents of the top of stack address register 125 and the scan counter 135 are again interchanged under the control of control unit 170, leaving the top of stack address register at the incremented count, and the scan counter once again resumes counting.

Each request stored in the queuer request storage unit 120 is periodically compared with the contents of the disk address register 155. The selection of requests to be examined is performed by the scan counter 135.

When a true comparison between a request and the current disk address is indicated, and data is not already being transferred, the request can be removed from the queuer request storage unit to request register 140. At this time the request stored at the top of the stack is placed into a vacancy left by the selector request (there being more than one storage location required for some access requests). This is done by again interchanging the contents of the top of stack address register 125 and the scan counter 135. The request at the top of the stack is then transferred to the request register 140 and the contents of the scan counter is decremented by one. The contents of the scan counter and the top of stack address register are then interchanged again. The contents of the request register is thereby stored in the location specified by the scan counter, thus replacing the request which had been accepted, which now resides in the request register.

It is desirable to compare all of the stored requests with the current disk address before the disk address changes or the disk address register 155 is incremented. It is also desirable for the disk address register to be changed one increment at a time. This insures a true comparison for every request during each revolution of the disk.

If there are a high number of one segment, character, byte or partial word data transfers to be effected by the disk file system, it may not be possible to review all of the requests in present queuers each time the disk address changes. Each of the disk transfer jobs must nevertheless be stored by a queuer system for most efficient operation of the disk file. It may also be imperative that many transfer requests be accepted and responded to during each revolution of the disk if the data transfers are real-time communications or are sufficiently high in number. A more detailed description of a representative queuer system as illustrated in FIG. 1 is described in a patent issued to the same assignee as the present invention. It is entitled "Queuer Control System," by Charles R. Questa, U.S. Pat. No. 3,493,935, issued Feb. 3, 1970. The present invention is an improvement over that earlier disclosure.

Figure 2:
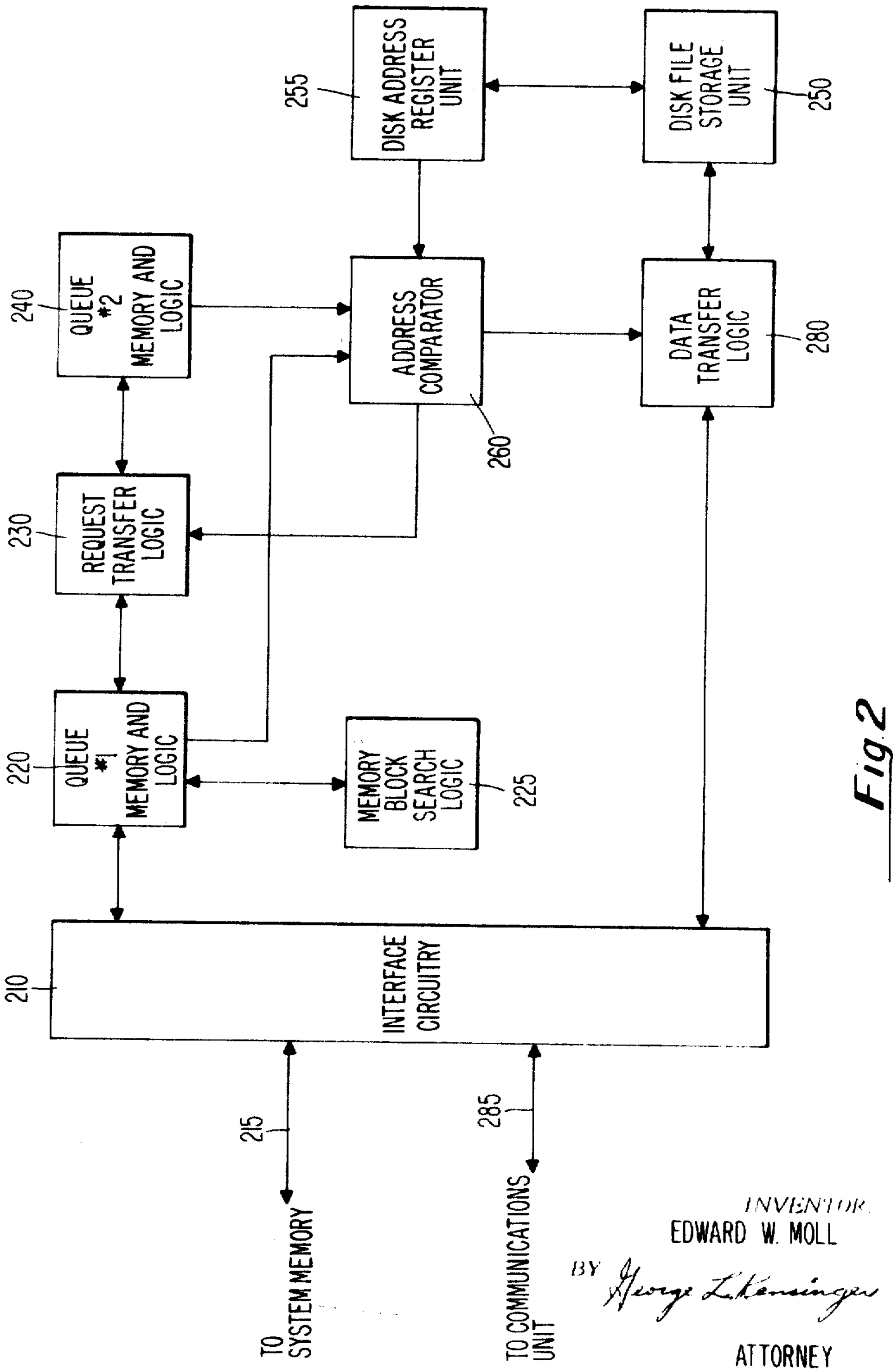
FIG. 2 is a generalized block diagram of a two-stage queuer system for a disk file storage unit.

Accordingly, there is provided in the queuer system of FIG. 2, first and second queue memories 220 and 240 for storing access request words relating to information transfers to be performed by disk file storage unit 250. Information transfer requests are received from, and data bytes or words are interchanged with, a system memory by interface circuitry 210 via cable 215. Similarly, information transfer requests are received from, and data is interchanged with an I/O communications unit by interface circuitry 210 via cable 285.

Queue 1 memory and logic 220 is coupled with interface circuitry 210 and memory block search logic 225. Request transfer logic 230 couples Queue 1 memory and logic 220 with Queue 2 memory and logic 240, subject to control by address comparator 260 which is also coupled to disk address register unit 255 and to data transfer logic 280. Disk file storage unit 250 is coupled to disk address register unit 255 and to data transfer logic 280, which in turn is coupled to interface circuitry 210.

In one embodiment the first queuer stage 220 has a large storage capacity and requires a relatively long period for a complete scan of its storage locations. The second queuer stage 240 has a lower storage capacity and a shorter scan period. The first stage accepts any information transfer job that is within its own scan period and forwards it to the second stage through request transfer logic 230 as the corresponding disk address is upcoming, determined by address comparator 260. The first stage queuer 220, in addition to having a large capacity and being relatively slow, is also relatively inexpensive. This stage receives all transaction requests given to the queuer system. It scans the transaction requests and passes them to the second stage queue storage unit 240 when the sequential access storage device (the disk file storage unit 250 in this case) is in such a position that the request address would be passed if it remained in Queue 1 for another scan cycle.

The second stage queuer 240 employs a high speed scanner which scans all of its requests within one address counter increment of the disk file storage unit 250. It alternately makes two tests: (1) it tests and accepts any job that is within its own scan period, and (2) tests and returns jobs to the first queuer stage 220 which relate to disk addresses which are beyond the current disk address (within limits, so that jobs are not returned to the first queuer stage which relate to addresses which are within a predetermined distance from the present address).

When a request meets the acceptance criteria, one of two actions are taken: (1) if the disk file is ready or available for a transaction, the transaction is performed or (2) if the disk file is not ready (e.g., busy or out of order), the transfer request is modified to note the conditions or events occurred and returned to queue stage 01, where it will again be scanned in its turn.

The two-stage queuer system of FIG. 2 also keeps track of the availability of disk file input data buffer areas in the storage unit provided for the Queue 01 memory. The queuer system makes these data buffer areas available to the I/O communications units of the computer of data communications system under the control of memory block search logic 225. To accomplish these two storage functions, the Queue 01 memory of the disk file controller of FIG. 2 contains two parts: a queue of predetermined size, and an input-data-buffer available table in the remaining portion of the unit. The information stored in each section of the memory is received and stored in different formats, which reflects the different inherent significance thereof.

Figure 3:
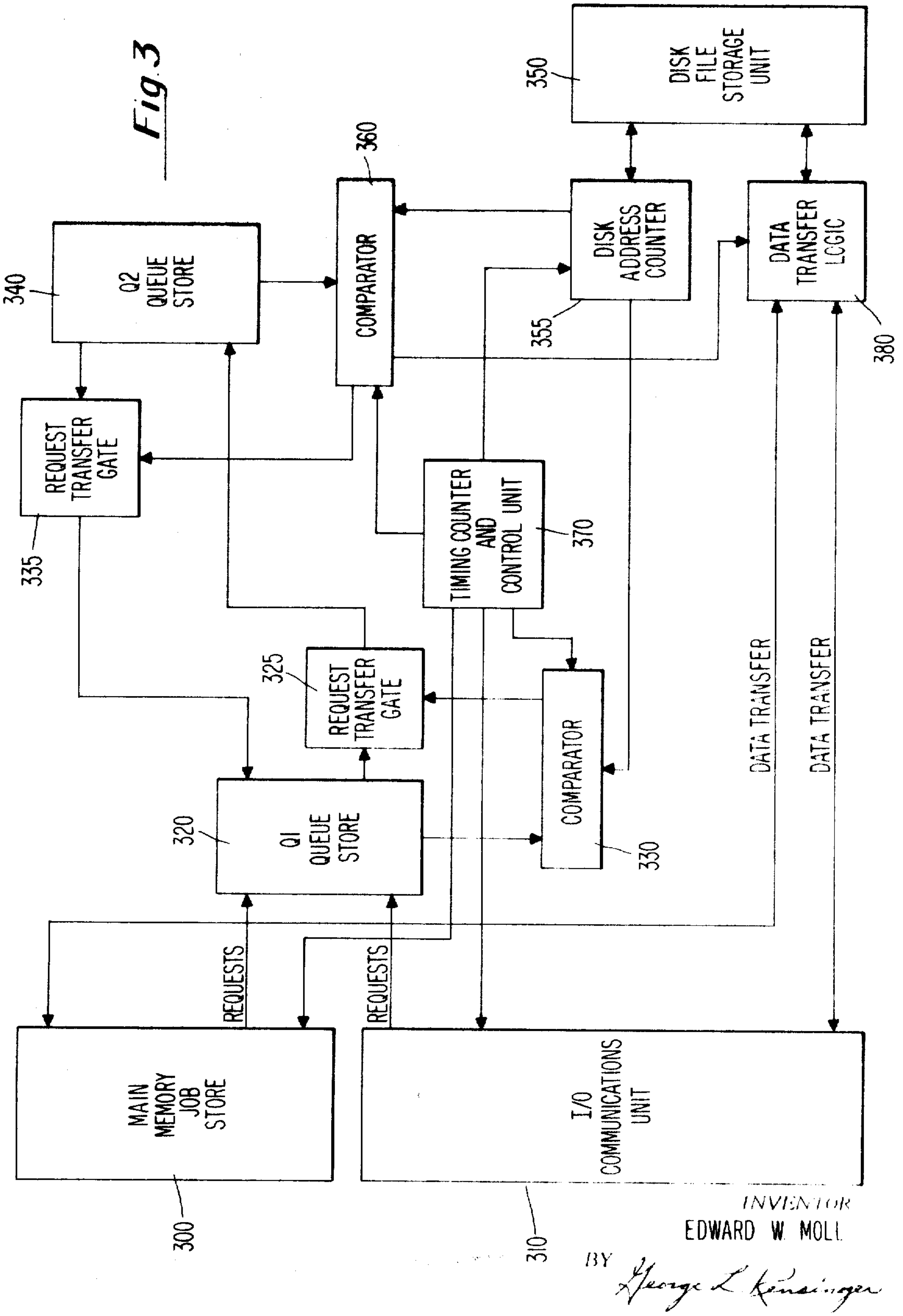
FIG. 3 is a schematic block diagram of a two-stage queuer system for a disk file storage unit.

In FIG. 3 there is illustrated a more detailed schematic block diagram of a two-stage queuer system for a disk file storage unit 350. Information transfer requests are received by Q1 queue store 320 from main memory job store 300 and from I/O communications unit 310. These access request words are compared by comparator 330 with the current disk address indicated by disk address counter 355 which is coupled to the disk file storage unit and are transferred to Q2 queue store 340 through request transfer gate 325 when the current disk location is approaching the request being scanned or sampled in queue store 320.

The access request words stored in queue store 340 are compared with the current disk address of disk address counter 355 by comparator 360, which enables the transfer of data by data transfer logic 380 between the disk file storage unit and the main memory job store 300 or the I/O communications unit 310 when the address for the transfer is in position in the disk file. A true comparison is found each revolution of the disk unit for each request stored in the second stage queue store 340. If any transfer request stored therein cannot be executed when its address is in position in the disk file unit, the request is returned to the first stage queuer 320 through request transfer gate 335 under control of comparator 360. The operation of comparators 330 and 360 and the transfer of requests from main memory job store 300 and I/O communications unit 310 to the first stage queue store 320 is controlled or sequenced by timing counter and control unit 370, as is disk address counter 355. The following details of the timing counter and control unit are more specifically set forth in FIG. 4 wherein a preferred embodiment of the invention is shown. Thus, the timing counter and control unit 370 would include the address constant adder 458, whose structural and functional detail is more clearly set forth later in this description.

In one embodiment only the more significant bits of the access request address field in the first stage queue store 320 are compared by comparator 330 with the current disk address to transfer requests to the second stage queue store 340. The access request words stored in queue store 340 are all compared with the current disk address by comparator 360 within one disk segment time or period, before the disk address is incremented again. Each job request stored in the queue stores contains the relevant disk address as well as the source or repository address of a memory location in either a central data system or in an I/O communications control unit.

The requests stored in Q1 queue store 320 may be compared with a predetermined range of disk addresses specified by program variables controlling the operation of comparator 330. When a true comparison is obtained, the job request is transferred from Q1 queue store 320 to Q2 queue store 340 through request transfer gate 325.

The comparison of access request jobs stored in Q2 store 340 are referenced to the current disk address modified for whatever time is required for track switching if disk file storage unit 350 is a multiple track disk file unit. When a true comparison is reached for a job request stored in the Q2 store 340, the job request contents are used to initiate a data transfer by data transfer logic 380. If the transfer logic is busy at the time, this condition is loaded in the job request word and the job request word is then returned to the first stage queue store 320. The job request continues to be passed between queue 1 store 320 and queue 2 store 340 until comparator 360 of the second stage queuer is able to initiate a data transfer from the true comparison obtained at that stage.

Figure 4:
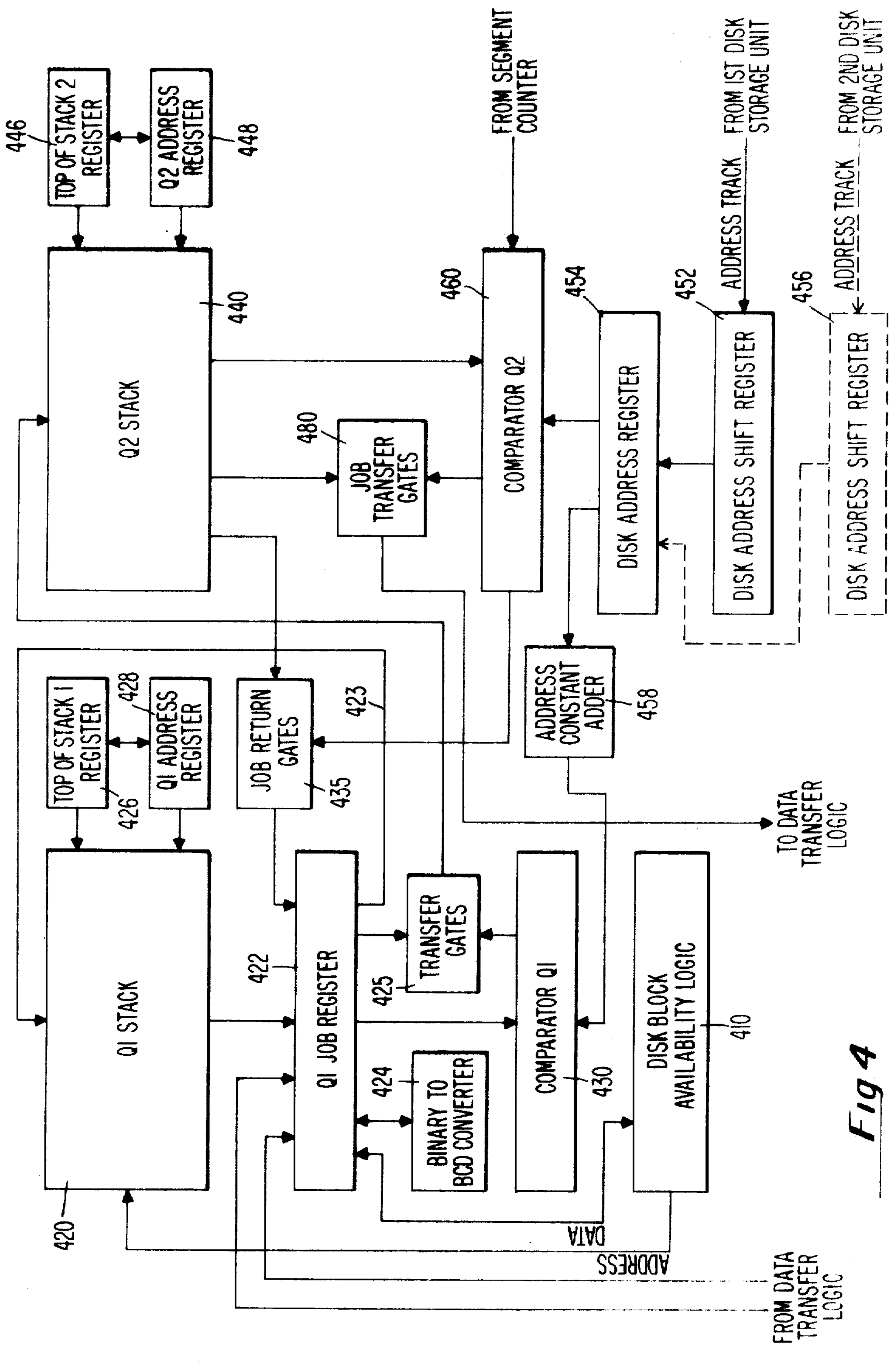
FIG. 4 is an electrical schematic diagram of a two-stage queuer system for a disk file controller.
Figure 5:
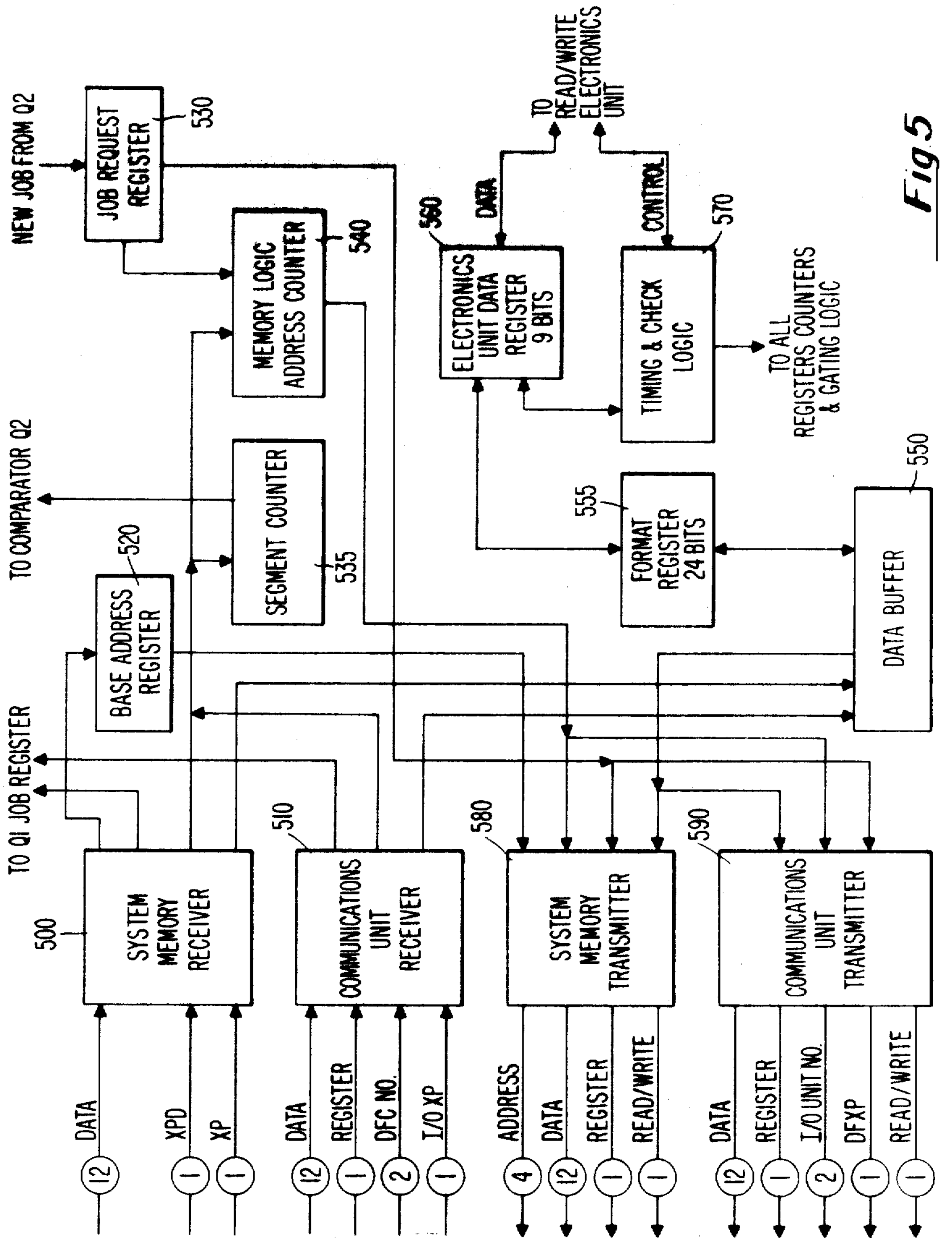
FIG. 5 is an electrical schematic diagram of data transfer logic suitable for connection and use in a disk file controller together with the queuer system of FIG. 4, FIG. 6 illustrating various word formats for use in the system.

FIGS. 4 and 5 show the access request queuer system and the data transfer logic which may be connected together to form a preferred disk file controller. The queuer system of FIG. 4 includes a Q1 memory stack 420 and a Q2 memory stack 440 for storing access request words for a disk file storage unit (not shown). The data transfer logic of FIG. 5 includes a system memory receiver unit 500 and a communications unit receiver module 510 for receiving data for transfer to a disk file as well as data transfer request access words which are transmitted to Q1 job register 422 of FIG. 4. This register has a data transfer path 423 for placing new jobs into Q1 stack 420 or for returning them thereto after examination in Q1 job register 422 by Q1 comparator 430 of FIG. 4.

The queuer portion of the Disk File Controller (DFC) is shown in FIG. 4. The queuer is divided into two parts enabling it to perform a two-stage queuing operation. The first stage is performed with the use of 390 words of the 3-microsecond cycle memory designated as queue 01 stack 420. Every 3 microseconds a transfer request is read into the queue 01 register 422 and compared with the disk address register 454. The comparator 430 includes a constant 458 which provides the accepting of a request which would be missed if the complete queue cycle were necessary before that particular request was compared again. When the comparator 430 rejects a request, it is again restored, via line 423, in queue 01 stack. When the comparator 430 accepts a queue 01 request, the request is transferred by transfer gates 425 to the queue 02 stack 440. The queue 02 stack 440 utilizes a solid-state scratch pad memory for storing 16 48-bit transfer requests.

Using a standard 3-megacycle clock, a request from the queue 02 stack 440 is compared each clock time. As noted, the queue 02 stack 440 has a capacity of 16 48-bit transfer requests. The comparator 460 reviews each of the requests and accepts the first one it sees within track switching time of the disk address contained in the disk address register 454. The head switching time of the preferred embodiment is 50 microseconds. Before the disk address register 454 changes to the next segment, queue 02 comparator 460 again samples each request in queue 02 stack 440. This time true comparisons indicate that a request has been missed and the job request is forwarded via the job return gates to the queue 01 register for return to queue 01 stack.

The queuer address registers 428, 448 control the scanning sequence of their respective queuer stacks 420, 448. The top of stack registers 426, 446 are pointers to the top of their respective stacks and are incremented and decremented as requests are added and subtracted from the stacks.

There is a disk address shift register 452,456 for each disk storage unit serviced by the Disk File Controller (DFC). Addresses are continually being shifted serially into each disk address shift register from its respective disk storage unit. One additional clock time is required each time a request shifts from one disk storage unit to the other. The disk address register 454 copies the shift register desired whenever the request is for a disk other than the one presently in the disk address register and at the beginning of each segment time of either disk.

The top of stack 1 register 426 monitors the requests stored in Q1 stack 420 and maintains a running account of the number of requests stored therein. Q1 address register 428 periodically scans the access request words stored in the Q1 stack. Q1 job register 422 receives binary request access, addresses from system memory receiver 500 and communications unit receiver 510 through the data transfer logic of FIG. 5 and converts then to binary-coded decimal (BCD) digits for subsequent storage in Q1 stack 420 and Q2 stack 440 and comparison by Q1 comparator 430 and Q2 comparator 460 of FIG. 4. This code conversion is performed by binary to BCD converter 424 of FIG. 4.

A request is accepted for storage by Q1 stack 420 when its address is compared by Q1 comparator 430 with a current disk address which would be passed if the request were ignored until the next complete scan of the Q1 and Q2 stacks, which would be the next opportunity for comparison. The acceptance of transfer requests for storage by Q1 stack 420 is controlled by address constant adder 458 coupled between Q1 comparator 430 and disk address register 454 which indicates the current disk address. The address constant added by address constant adder 458 is proportional to the period or cycle of the scanning of Q1 stack 420 by Q1 address register 428. This constant assures the acceptance of requests which would be missed or passed over if the complete queuer cycle were repeated before they could be compared again.

The periodic review of access request words stored in Q1 stack 420 by Q1 comparator 430 also controls the transfer requests to Q2 stack 440 through transfer gates 425 which would be passed over or missed if the Q2 stack scan period controlled by top of stack register 446 and Q2 address register 448 were to be repeated before the requests were examined again. This transfer of requests from Q1 job register 422 through transfer gates 425 is subject to a constant built into Q1 comparator 430 which is proportional to the scan period of Q2 stack 440. Alternatively, this constant proportional to the Q2 stack scan period may be built into transfer gates 425 themselves.

The scanning of Q2 stack 440 is controlled by Q2 address register 448 together with top of stack 2 register 446. Q2 comparator 460 compares the requests stored in Q2 stack 440 with the current disk address received from disk address register 454 and controls job transfer gates 480 for transmitting a job request from the Q2 stack to the data transfer logic of FIG. 5.

The Q2 stack 440 is scanned and sampled every clock time. Q2 comparator 460 compares every access request word stored in Q2 stack 440 with the current disk address received from disk address register 454 within one disk time of the disk file to which the system is coupled by disk address shift register 452 and optional second disk address register 456. Because of the short cycle time of Q2 stack 440, a transfer request comparison by Q2 comparator 460 may indicate acceptance with a look-ahead time equal only to the track switching time. This request acceptance limit is provided by a constant built into Q2 comparator 460 or alternatively built into job transfer gates 480.

Q2 comparator 460 reviews each of the requests stored in Q2 stack 440 and accepts the first one it sees within the track switching time of the disk address contained in disk address register 454. Before the disk address register changes to the next segment, Q2 comparator 460 again samples each request stored in Q2 stack 440. This time a true comparison indicates that a request has been missed and the job is then returned to Q1 job register 422 through job return gates 435 under control of Q2 comparator 460 for return to Q1 stack 420.

Queuer address registers 428 and 448 control the scanning sequence of their respective queuer stacks 420 and 440. The top of stack registers 426 and 446 are pointers to the top of the stack and are incremented and decremented as requests are added and subtracted from their respective stacks.

There is a disk address shift register 452, 456, . . . for each disk storage unit serviced by the disk file controller of FIGS. 4 and 5. Addresses are continually shifted serially into each disk address shift register from its respective disk storage unit. One additional clock time of timing and check logic unit 570 of FIG. 5 elapses each time a request shifts from one disk storage unit to the other. The disk address register copies the shift register desired whenever the request is for a disk other than the one presently in the disk address register and at the beginning of each segment time of either disk.

The disk file transfer logic of FIG. 5 processes requests as they are accepted by the queuer system of FIG. 4. The data transfer logic of FIG. 5 transfers one request at a time through either system memory transmitter 580 or communications unit transmitter 590 and remains busy until the transfer is completed. Transfer requests accepted or selected by the queuer system of FIG. 4 for performance are forwarded to job request 530 of FIG. 5 by job transfer gates 480 under the control of Q2 comparator 460 of FIG. 4.

For requests of data transfer from the disk file to an I/O communications unit through communications unit transmitter 590, the data transfer logic immediately starts transferring data via the electronics unit data register 560 and the format register 555 to the data buffer 550. The data is received and formatted into words by format register 555 and the data buffer transfer gates (not shown). The check logic of control unit 570 reviews the characters or bytes as they are received from the disk file and verifies a valid transfer by the use of a segment check character stored on the disk.

When the data buffer 550 contains a full segment, a request is given to an I/O communications unit for data transfer. At the time a request is given to an I/O unit, the data line contains the I/O communications unit memory address. Two additional lines shown select the appropriate I/O unit number. When the request is accepted by the I/O unit, an acknowledgment cross point signal (I/O XP) is received by communications unit receiver 510 and the data buffer transfers a full segment to the I/O communications unit.

When the request is for a data transfer from an I/O communications unit to the disk file, the sequence is reversed. A request is sent to the I/O unit with the I/O memory address appearing on the data leads and the I/O unit number appearing on the I/O unit number conductors. The I/O XP lead conveys a response signal for synchronizing the request and a full segment of data is transferred to data buffer 550. When the next segment marker is received by the timing and check logic 570, the data is transferred from the data buffer via the format register 555 and the electronics unit data register 560 to the read-write electronics unit of the disk file to which it is connected.

Figure 6:
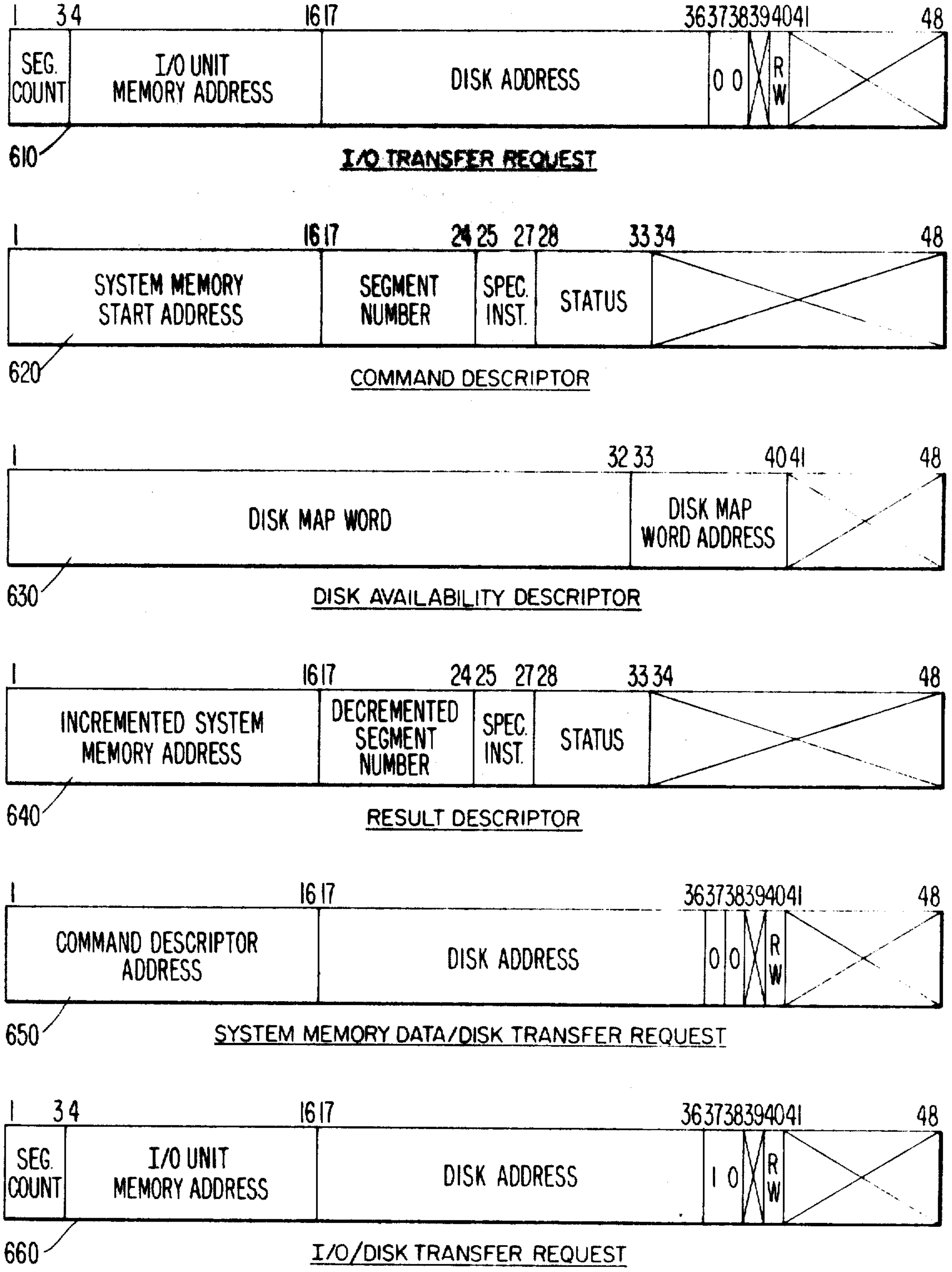

Job requests for data transfers through system memory transmitter 580 between a system memory and a disk file to which the data transfer logic of FIG. 5 is connected are similar to the above-described transfers for I/O communications units except for the addition of command and result descriptors 620 and 640 illustrated in FIG. 6. System memory transfer requests contain a memory location for obtaining a command descriptor. Main memory is addressed via the system memory transmitter 580 in order to read the command descriptor from the desired memory location. The command descriptor is received by way of the data lines and the system memory receiver 500 into the segment counter 535 and the memory location address counter 540. When the command descriptor is received, the data is transferred between the disk and the system memory as requested. The transfer of data is similar to that between an I/O communications unit and the system memory. A result descriptor is returned to the system memory location which is one beyond the location of the command descriptor.

Two queuer stages are sufficient in most cases for storing and transmitting access request words for disk file storage units under normal data communication transfer rates. However, additional stages may be provided to progressively move a transaction request from slow queuer storage stages or devices to faster queuer storage devices until the last one scans its entire contents within one increment of the sequential access storage device (such as a disk file storage unit). A principle advantage of multistage queuing is to make economically feasible the queuing of large numbers of transactions and/or to contain a high number of backed up transaction requests as may occur in handling a large number of one segment, character or byte data transfers in many data communications or data switching systems.

The disc file controller of FIGS. 4 and 5 contains a disk block availability map which automatically assigns available blocks of storage when requested by an I/O communications unit. A disk block availability map is contained in Q1 stack 420. Each bit of the storage locations in the map represents the status of a differently defined memory block. A zero in a bit position indicates an unavailable position and a one in a bit position indicates that the block beginning with that bit is available. During system start-up most of the bit positions are set to one, making the respective blocks available.

When the disk file controller is requested by an I/O communications unit to assign a new block, disk block availability logic 410 scans the corresponding portion of Q1 stack 420 until it sees a bit which is set to one, representing an available block. A disk block availability word is read from Q1 stack 420 into Q1 job register 422 and is tested for ONE's. Any of the bits of this word which are a one indicate the beginning of an available data buffer block in Q1 stack 420.

A flip-flop is provided (not shown) for each disk block availability word contained in Q1 stack 420. When a search of an entire disk block availability word has not yielded a one, the corresponding flip-flop is set and that word is bypassed on all subsequent scans by disk block availability logic 410 until modified under control of the system.

The organization of the preferred disk file is straightforward. One disk file controller controls a disk file electronics unit which can operate two disk file storage units. There are four disk or eight disk surfaces per storage module with 1250 segments per track and 50 information tracks per disk face.

Each storage module is capable of storing two million 48-bit words. Reading and writing is done in segments, each segment consisting of four words. Each disk face contains 62,500 segments or 500,000 segments per storage unit.

The disk face layout includes four zones of tracks on each disk face, one clock zone and three data zones. The data zones each contain 50 tracks and are used simultaneously so that in effect the disk addressing will be characteristic of a single-zone 50-track disk with increased transfer rate. The bits stored in each segment for each zone are as follows: 46 bits in zone one, 69 bits in zone two, 92 bits in zone three, totaling 207 bits; 192 bits are used for data and 15 bits are used for checking and guard bits. The recording frequencies of zone one, two and three are at 1 mc. 1.5 mc. and 2 mc. respectively. Simultaneous transfers of all three zones produce 9 bits every 2 microseconds. The zone/bit ratio is two bits in zone one, three bits in zone two, and four bits in zone three. Transfers are made between the Disk File Controller (DFC) and the storage unit by the electronics unit of 9-bit characters every 2 microseconds until 207 bits are transferred. This amounts to a transfer rate of one word every 12 microseconds. The disk file controller has a capacity of storing two four-word segments so that a full four-word segment time is allowed for interface to the system memory.

Illustrative examples of the information stored in the two sections of Q1 stack 420 are provided in the drawing of FIG. 6. The format of each of the disk file controller words of FIG. 6 is clearly indicated.

Previously discussed command descriptor 620 is received by system memory receiver 500 of the disk file controller from the system at which it originates. Conversely, previously discussed result descriptor 640 is originated by the disk file controller and is transferred to a system memory by system memory transmitter 580.

I/O transfer request word 610 is originated by an I/O communications control unit of the system and is received by the controller through communications unit receiver 510 for entry in Q1 job register 422 and eventual storage in the queuer stacks. Disk availability descriptor 630 is received from the memory of the system at which it originates through system memory receiver 500 of the disk file controller.

System memory data/disc transfer request word 650 is received either from a system memory or the disk file storage unit itself and is entered into Q1 job register 422 for eventual storage in the queuer system. I/O disc transfer request word 660 is, similarly, originated by either an I/O communications unit of the serviced system or by the disk storage unit and is also placed into Q1 job register 422 for storage by the queuer system of FIGS. 4 and 5.

Although different embodiments of the present invention have been described in detail, it should be understood that the present disclosure is but an illustrative example of the invention and that many modifications and variations of the present invention are possible in the light of the above teachings. It is therefore, to be understood that within the scope of the appended claims, the invention may be practiced otherwise than as specifically described.

I claim:

1. A multistage queuer system for storing and presenting, in order, a plurality of access request words for a sequential access device comprising:

a first high storage capacity, slow access time queuer stage for receiving and storing access request words for the device, a second, lower storage capacity, faster access time queuer stage for storing and controllably transmitting the device access request words, each of said queuer stages having an addressing means coupled thereto, a first and a second comparator respectively connected to said first and second queuer stages, a sequential access device address means for indicating the address of the present location being accessed directly connected to said second comparator, an address constant adder connected between said sequential access device address means and said first comparator to add a fixed address constant to the address contained in said sequential access device address means such that the addresses in said first queuer stack are compared to addresses a fixed differences ahead of said addresses being compared in said second comparator, and transfer means connected between said first and said second queuer means and connectably responsive to said first comparator means to thereby enable the transfer of the stored addresses in said first queuer means to said second queuer a fixed period prior to the time that said second comparator means compares the address corresponding to the address in said disc address plus the fixed constant address.

2. The multistage queuer system as set forth in claim 1 wherein said fixed address constant is equal in time period to the scan period of the first storage means.

3. The multistage queuer system of claim 1 further including means for transferring job data in said second queuer storage back to said first queuer storage under the control of said second comparator means.

4. The multistage queuer system of claim 1 further including a disc address shift register connected to said disc address register for each disc storage unit connected to said queuer system.

5. The multistage queuer system of claim 1 further including a first and a second top of stack register respectively connected to said first and second queuer stages to store and thereby indicate the address location of the last portion of information respectively transferred thereto.

6. The multistage queuer system of claim 1 further including a job register connected to said first queuer stage for receiving the output therefrom, said job register including a first output means connected to said first comparator and a second output means connected to said first queuer stage to return the received output thereto when said transfer means are not enabled by said first comparator.

7. The multistage queuer system as set forth in claim 1 wherein said second comparator includes said fixed constant means and is capable of receiving the request contents of said disc address register and accepting the first request it receives within the track switching time of the sequential access device.

8. The multistage queuer system of claim 6 further including disc block availability map logical circuitry means connected to said job register means for bidirectional transfer of data between said logical circuitry and said job register.

9. The multistage queuer system of claim 6 further including a binary to binary-coded decimal digit converter connected to said job register to receive the binary contents of said job register and convert same to binary-coded decimal contents for subsequent storage in said first queuer stage.

PO-1050
(5/69)

UNITED STATES PATENT OFFICE
CERTIFICATE OF CORRECTION

Patent No. 3,593,314 Dated July 13, 1971

Inventor(s) Edward W. Moll

It is certified that error appears in the above-identified patent and that said Letters Patent are hereby corrected as shown below:

Column 5, line 1, after "Queue" change "01" to -- #1 --.

Column 6, in the portion added by the Amendment dated November 3, 1970, at line 14, beginning with "The queuer portion of the Disk File . . ." and up through line 43 of Column 6, change the "0" preceding the word "queue" to "#".

Signed and sealed this 28th day of March 1972.

(SEAL)
Attest:

EDWARD M.FLETCHER,JR.
Attesting Officer

ROBERT GOTTSCHALK
Commissioner of Patents